United States Patent [19]

Inomata et al.

[11] Patent Number: 4,517,017

[45] Date of Patent: May 14, 1985

[54] TEMPERATURE SENSITIVE AMORPHOUS MAGNETIC ALLOY

[75] Inventors: Koichiro Inomata, Yokohama; Shinichi Murata, Tokyo, both of Japan

[73] Assignee: Tokyo Shibaura Denki Kabushiki Kaisha, Kawasaki, Japan

[21] Appl. No.: 346,952

[22] Filed: Feb. 8, 1982

[30] Foreign Application Priority Data

Feb. 10, 1981 [JP] Japan ................................ 56-17431

[51] Int. Cl.$^3$ ............................................ C22C 33/00
[52] U.S. Cl. ................................ 75/123 B; 75/123 D; 75/123 K; 75/123 L; 75/126 A; 75/126 C; 75/126 H; 75/126 P; 75/126 K; 75/126 Q; 75/128 B; 75/128 C; 75/128 D; 75/128 P; 75/128 F; 148/403; 420/435; 420/436; 420/440; 420/441; 420/442; 420/452; 420/459
[58] Field of Search ................... 75/170, 171, 123 K, 75/123 L, 123 B, 123 D, 128 B, 128 C, 128 D, 128 P, 126 A, 126 C, 126 H, 126 P, 126 K, 126 Q, 128 F; 148/403; 420/435, 436, 440, 441, 442, 452, 459

[56] References Cited

U.S. PATENT DOCUMENTS

| | | | |
|---|---|---|---|
| 3,856,513 | 12/1974 | Chen et al. | 75/170 |
| 3,940,293 | 2/1976 | Polk et al. | 75/170 |
| 4,067,732 | 1/1978 | Ray | 75/171 |
| 4,144,058 | 3/1979 | Chen et al. | 75/123 K |
| 4,188,211 | 2/1980 | Yamaguchi et al. | 75/170 |
| 4,221,592 | 9/1980 | Ray | 75/170 |
| 4,314,594 | 1/1982 | Pfeifer et al. | 148/108 |

FOREIGN PATENT DOCUMENTS

| | | |
|---|---|---|
| 0042525 | 12/1981 | European Pat. Off. . |
| 3001889 | 7/1980 | Fed. Rep. of Germany . |
| 2368130 | 5/1978 | France . |
| 2376218 | 7/1978 | France . |
| 54-27994 | 3/1979 | Japan . |
| 55-113853 | 9/1980 | Japan . |

OTHER PUBLICATIONS

H. H. Liebermann; C. D. Graham, Jr.; and P. J. Flanders, "Changes in Curie Temperature, Physical Dimensions, and Magnetic Anisotropy During Annealing of Amorphous Magnetic Alloys", IEEE Transactions on Magnetics, vol. MAG-13, No. 5, Sep. 1977.
European Search Report.
O'Handley et al., "Magnetic Properties to TM$_{80}$P$_{20}$ Glasses," Journal of Applied Physics, vol. 48, No. 5, May 1977, p. 2095.
Arai et al., "Saturation Magnetostriction and Volume Magnetostriction of Amorphous Ribbons Based on Fe-Ni and Fe-Co," Rapidly Quenched Metals, 2nd Int. Conf., 1976.
Donnelly et al., "Low-Temperature Specific Heat of the Metallic Glasses Fe$_x$Ni$_{80-x}$P$_{14}$B$_6$ with X=0, 20, 40, 60, 80," Physical Rev. B, vol. 20, No. 3, Aug. 1, 1979, pp. 1211-1220.
Haregawa et al., "Electrical Resistivity and Curie Temperature of Amorphous (Fe—Ni)—P—C Alloys", Physics Letters, vol. 42A, No. 6, Jan. 15, 1973.

Primary Examiner—John P. Sheehan
Attorney, Agent, or Firm—Schwartz, Jeffery, Schwaab, Mack, Blumenthal & Koch

[57] ABSTRACT

Disclosed is a temperature sensitive amorphous magnetic alloy which shows a Curie point of not higher than 200° C. and whose composition is represented by the formula:

$$(M_{1-a}Ni_a)_{100-z}X_z$$

wherein
M = Co or Fe;
X = at least one of P, B, C and Si;
$0.2 \leq a \leq 0.8$ when M is Co, or $0.4 \leq a \leq 0.9$ when M is Fe; and
$15 \leq z \leq 30$.

7 Claims, 6 Drawing Figures

TEMPERATURE SENSITIVE AMORPHOUS MAGNETIC ALLOY

BACKGROUND OF THE INVENTION

This invention relates to a temperature sensitive magnetic material, and more particularly, relates to a temperature sensitive amorphous magnetic alloy whose magnetic permeability varies abruptly in the vicinity of its Curie point.

Conventionally, temperature sensitive magnetic materials have widely been used for a temperature sensor such as thermoswitch for a rice cooker, which may detect a preset temperature or protect a circuit by utilizing the property that a voltage, which is, for example, induced at a coil $N_L$ by exciting a magnetic core 1 used as a heat sensor as shown in FIG. 1a, disappears at a temperature higher than the Curie point. (FIG. 1b illustrates a performance, in which $t_s$ shows the time when the temperature of the magnetic core 1 has reached the Curie point). In general, the characteristics which are required of this kind of material should preferably be that the saturated magnetic flux density is large, and the values of saturated magnetic flux density, coercive force and magnetic permeability relative to temperature vary abruptly at a preset temperature, and also that the heat response is quick. As the preset temperature, the Curie point of the material is usually utilized. Therefore, it is preferable that a variety of Curie points is obtainable by varying the composition of the material.

Ferrites, having a Curie point of −40° C. to 150° C., have been used as this kind of temperature sensitive material. However, ferrites have a magnetic flux density as low as 5,500 G, and their initial magnetic permeability in the vicinity of Curie point is at most about 7,000 at 10 KHz, thereby showing small variation of the magnetic permeability at the Curie point. Ferrites are disadvantageous also in that they show slow heat response because of their poor thermal conductivity.

On the other hand, amorphous alloys which have no crystal structure have been noted because of their various interesting characteristics. Particularly, expected are applications thereof to novel soft magnetic materials because they show excellent magnetic properties such as higher saturation magnetization, higher magnetic permeability and lower coercive force. These amorphous alloys can be obtained by, for example, rapidly cooling molten mother alloys at a cooling rate of not less than about $10^5$°C./sec. Of the amorphous alloys, the one containing a transition metal such as iron(Fe) or cobalt(Co) as a main component and a metalloid element is known to have higher saturation magnetization and higher magnetic permeability. Since, however, an amorphous alloy is in a metastable condition, its characteristics generally vary by heating the alloy at a certain temperature which is considerably lower than its crystallization temperature.

For example, in the case of the above-mentioned amorphous alloys composed mainly of Fe or Co, crystallization gradually proceeds when it is exposed for a long time to a temperature higher than 300° C., with the result that it becomes mechanically brittle and loses the tenacity peculiar to amorphous alloys. Further, in the case of an amorphous alloy having a relatively higher Curie point, magnetic permeability is extremely lowered and coercive force increases even if it is heated at a temperature lower than 300° C., whereby the soft magnetic properties will deteriorate, and therefore such an amorphous alloy is not suitable for a temperature-sensing element.

SUMMARY OF THE INVENTION

In view of the foregoing, this invention aims to provide a temperature sensitive amorphous magnetic alloy whose magnetic flux density is large and whose magnetic permeability varies markedly in the vicinity of its Curie point, and which shows quick and sure response even when used repeatedly.

According to this invention, there is provided a temperature sensitive amorphous magnetic alloy which shows a Curie point of not higher than 200° C. and whose composition is represented by the formula:

$$(M_{1-a}Ni_a)_{100-z}X_z$$

wherein
M represents a cobalt atom(Co) or an iron atom (Fe);
X represents at least one of a phosphorus atom(P), a boron atom(B), a carbon atom(C) and a silicon atom(Si);
a is a numeral ranging between 0.2 and 0.8 inclusive (i.e., $0.2 \leq a \leq 0.8$), preferably between 0.5 and 0.7 inclusive (i.e., $0.5 \leq a \leq 0.7$) when M is Co, or a is a numeral ranging between 0.4 and 0.9 inclusive (i.e., $0.4 \leq a \leq 0.9$), preferably between 0.6 and 0.8 inclusive (i.e., $0.6 \leq a \leq 0.8$) when M is Fe; and
z is a numeral ranging between 15 and 30 inclusive (i.e., $15 \leq z \leq 30$), preferably between 20 and 25 inclusive (i.e., $20 \leq z \leq 25$).

In the above formula, when the component represented by M (i.e., Co or Fe) is substituted with not more than 5 atom % relative to the total formula weight exclusive of % (i.e., M+Ni=1) of chromium(Cr), the magnetic permeability of the alloy is enhanced and the change of the magnetic permeability in the vicinity of the Curie point becomes more remarkable.

DETAILED DESCRIPTION OF PREFERRED EMBODIMENTS

This invention is based on the finding that an amorphous alloy having no crystal structure and being in a metastable condition changes its characteristics when heated up to a temperature around a specific point (i.e., Curie point). It has been found particularly that the amorphous alloy according to this invention changes sharply its magnetic permeability in the vicinity of the Curie point, and further that it has the temperature sensitivity such that it shows quick and sure response even when used repeatedly.

Nickel(Ni) used in the alloy according to this invention is an element effective for adjusting the response temperature, i.e., the Curie point of the alloy. When it is used in combination with Co in such an amount that the numeral a in the above formula is less than 0.2 (i.e., $a \leq 0.2$), the Curie point of the alloy will become higher than 200° C. and the thermal stability of the alloy will be inferior after repeated use thereof and the change of the magnetic permeability of the alloy in the vicinity of the Curie point will be too large for the alloy to be practically applied. If Ni is employed in such an amount that the numeral a is larger than 0.8 (i.e., $a \geq 0.8$), the Curie point of the alloy will become lower than the liquid nitrogen temperature, which renders the alloy impractical in applications.

When Ni is used in combination with Fe in such an amount that the numeral a is less than 0.4 (i.e., a≦0.4), the Curie point will become higher than 200° C. and the thermal stability of the alloy will be inferior after repeated use thereof and the change of the magnetic permeability of the alloy in the vicinity of the Curie point will be too large for the alloy to be practically applied. If Ni is employed in such an amount that the numeral a is larger than 0.9 (i.e., a≧0.9), the Curie point will become lower than the temperature of liquid nitrogen, which renders the alloy impractical in applications.

Chromium(Cr) is an element effective for enhancing the magnetic permeability of the alloy, improving the corrosion resistance of the alloy and also adjusting the Curie point of the alloy. However, if its content exceeds 5 atom % with respect to Fe or Co, the preparation of amorphous alloy will become more difficult.

The X is an element or elements essential for making the alloy amorphous. If, however, the amount thereof is out of those defined in this invention, the formation of amorphous alloy will become difficult.

Figure 1A:
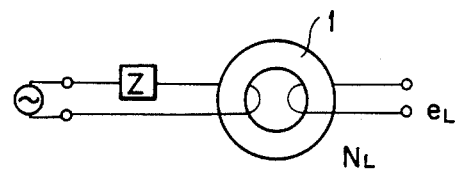
Figure 2:
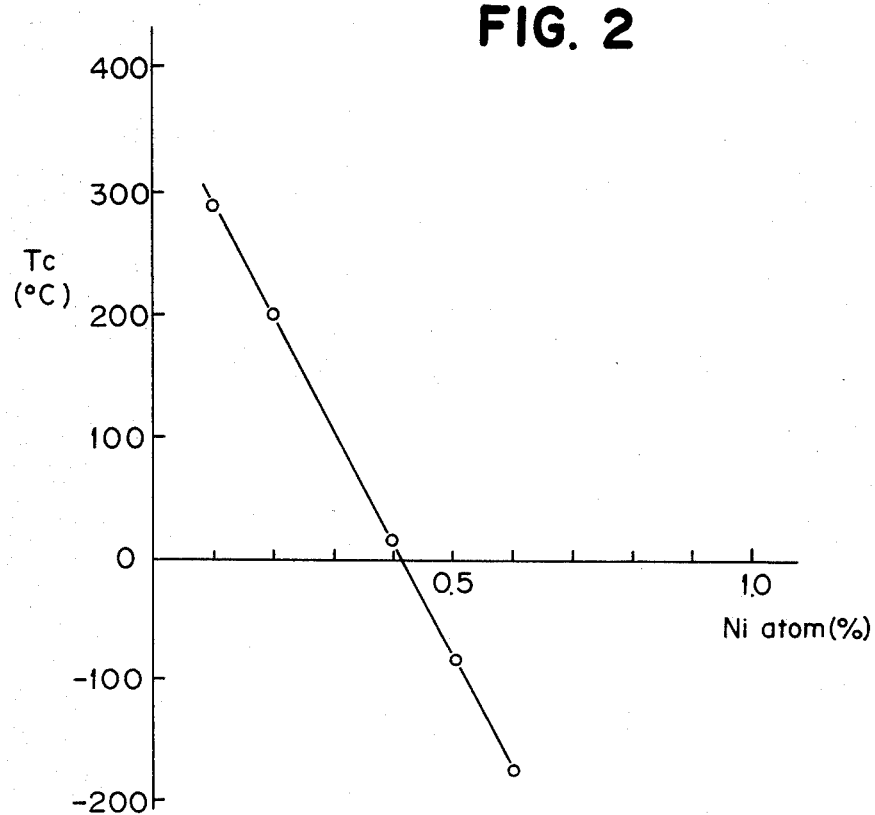
Figure 3:
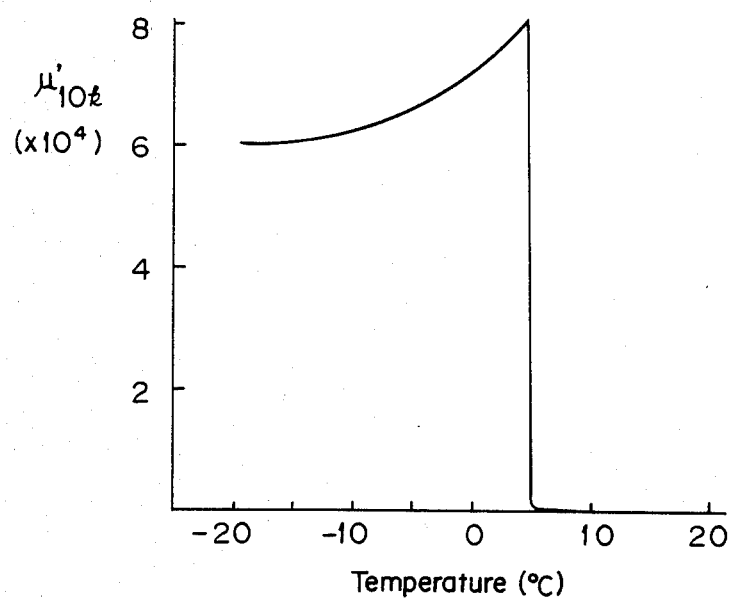
Figure 4:
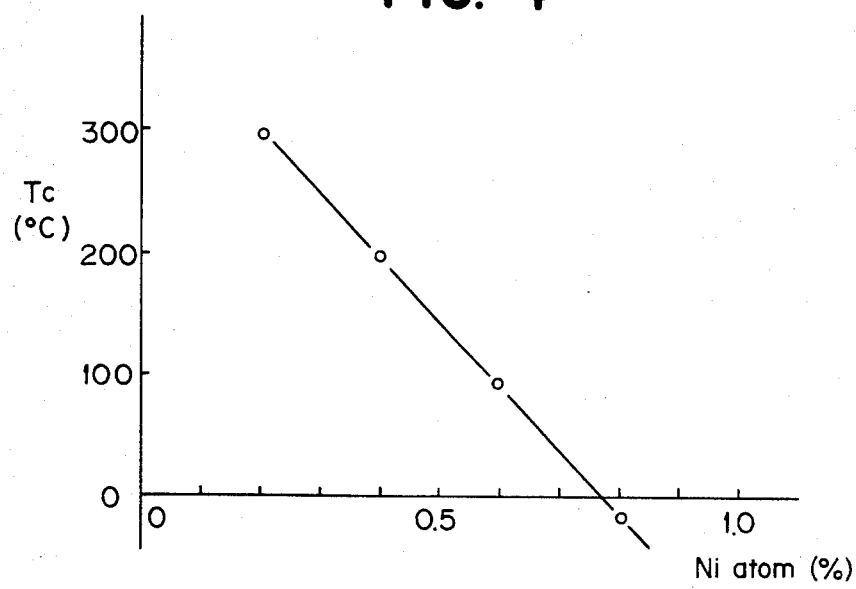
Figure 5:
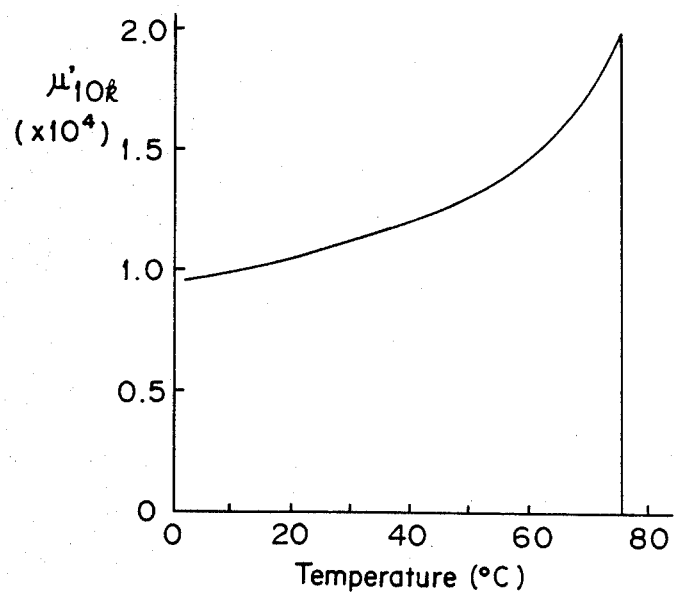

This invention will be described below in more detail by way of Examples, and with reference to the accompanying drawings, in which;

FIGS. 1a and b, already referred to in the foregoing, are views illustrating a principle for a construction example where a temperature sensitive magnetic material is employed for a magnetic core (1) to perform temperature control;

FIGS. 2 and 4 are graphical representations showing the Curie point of the alloy depending upon the content of Ni; and FIGS. 3 and 5 are graphical representations showing the change in magnetic permeability depending upon the temperature.

EXAMPLE 1

Prepared by twin-roller method were amorphous alloys having a composition of $(Co_{1-a}Ni_a)_{75}Si_{10}B_{15}$, each having thickness of 30 μm. These were partially cut out and annealed at 400° C. for ten minutes. Thereafter, temperature valiations of their magnetization were measured by the use of a vibrating sample magnetometer(VSM) to obtain Curie points Tc. Relationship between Tc and the content of Ni was as shown in FIG. 2, from which it will be seen that Curie point decreases linearly with increasing Ni contents.

Measured next were temperature variations of effective permeability at 10 KHz, i.e., $\mu'_{10k}$, with respect to every composition given in FIG. 2. Results are shown in FIG. 3 as to a representative example, $(Co_{0.35}Ni_{0.65})_{78}Si_8B_{14}$. It can be seen therefrom that the magnetic permeability in the vicinity of Tc (5° C.) indicates 80,000 which is far larger than 7,000 in the case of ferrites, and also that the difference between the temperature providing maximum value of $\mu'_{10k}$ and the temperature of Tc is as small as 3° C. and an abrupt variation of permeability takes place by such a slight temperature-difference.

A heat cycle ranging from room temperature to the Curie point (5° C.) was repeated a hundred times in respect of the above same sample, but deterioration of magnetic permeability and variation with time of the Curie point were not observed and good thermal stability was recognized thereabout.

The same heat cycle as above was repeated also for each of the amorphous alloys having various Ni contents shown in FIG. 2 to observe the variations of magnetic permeabilities and Curie points. It was thereby confirmed that the amorphous alloys outside this invention caused variation of the Curie point and the deterioration of magnetic permeability when the heat cycle was repeated several times, and therefore were not suitable for temperature sensitive magnetic materials.

EXAMPLE 2

Prepared by twin-roller method were amorphous alloys having a composition of $(Fe_{1-a}Ni_a)_{75}B_{25}$, each having thickness of 30 μm. These were subjected to heat treatment at 400° C. for fifteen minutes, and thereafter, dependence of Tc for Ni content was determined to obtain the results as shown in FIG. 4. Measured was $\mu'_{10k}$ with respect to every composition given in FIG. 4. Results are shown in FIG. 5 as to a representative example, $(Fe_{0.25}Ni_{0.75})_{80}B_{20}$. It can be seen therefrom that the $\mu'_{10k}$ in the vicinity of Tc (75° C.) indicates 20,000 which is far larger than 7,000 in the case of ferrites.

A heat cycle ranging from room temperature to Tc (75° C.) was repeated a hundred times in respect of the above same sample, but deterioration of magnetic permeability and variation of the Curie point were not observed and good thermal stability was recognized thereabout.

Similarly, the heat cycle ranging from room temperature to Tc was repeated for each of the amorphous alloys having various Ni contents shown in FIG. 4 to observe the variations of magnetic permeabilities and Curie points. It was thereby found that the amorphous alloys outside this invention caused the variation of Tc with time and the deterioration of magnetic permeability when the heat cycle was repeated several times, and therefore were not suitable for temperature sensitive magnetic materials.

EXAMPLES 3 TO 16 AND COMPARATIVE EXAMPLES 1 TO 5

Prepared by twin-roller method and annealed at 400° C. for 10 to 15 minutes were amorphous alloys as shown in Table 1, for which the Tc and the values of $\mu'_{10k}$ in the vicinity of Tc were determined in the same manner as in Example 1. Results are shown together in Table 1.

TABLE 1

|  | Composition | Tc (°C.) | Maximum value of $\mu'_{10k}$ in the vicinity of Tc | ΔT* |
|---|---|---|---|---|
| Example 3 | $(Co_{0.3}Ni_{0.7})_{80}Si_{10}B_{10}$ | 7 | 85,000 | 3 |
| Example 4 | $(Co_{0.3}Ni_{0.7})_{80}P_{14}B_6$ | −3 | 64,000 | 3 |
| Example 5 | $(Co_{0.3}Ni_{0.7})_{80}P_{16}B_1C_3$ | −11 | 62,000 | 3 |
| Comparative Example 1 | $(Co_{0.1}Ni_{0.9})_{79}Si_8B_{13}$ | −135 | 12,000 | 10 |
| Example 6 | $(Co_{0.2}Ni_{0.8})_{79}Si_8B_{13}$ | −95 | 43,000 | 5 |
| Example 7 | $(Co_{0.5}Ni_{0.5})_{79}Si_8B_{13}$ | 190 | 51,000 | 3 |
| Example 8 | $(Co_{0.8}Ni_{0.2})_{75}Si_{10}B_{15}$ | 170 | 22,000 | 5 |
| Comparative | $(Co_{0.9}Ni_{0.1})_{79}Si_8B_{13}$ | 440 | 10,000 | 9 |

TABLE 1-continued

|  | Composition | Tc (°C.) | Maximum value of $\mu'_{10k}$ in the vicinity of Tc | ΔT* |
| --- | --- | --- | --- | --- |
| Example 2 | | | | |
| Example 9 | $(Co_{0.3}Ni_{0.67}Cr_{0.03})_{78}Si_8B_{14}$ | −35 | 110,000 | 2 |
| Example 10 | $(Co_{0.3}Ni_{0.66}Cr_{0.04})_{78}Si_8B_{14}$ | −50 | 58,000 | 3 |
| Comparative Example 3 | $(Co_{0.3}Ni_{0.61}Cr_{0.09})_{78}Si_8B_{14}$ | −125 | 15,000 | 15 |
| Example 11 | $(Fe_{0.3}Ni_{0.7})_{78}P_{10}B_{12}$ | −43 | 18,000 | 4 |
| Example 12 | $(Fe_{0.3}Ni_{0.5})_{74}Si_{10}B_{16}$ | 180 | 14,000 | 5 |
| Example 13 | $(Fe_{0.6}Ni_{0.4})_{72}Si_{10}B_{18}$ | 160 | 11,000 | 6 |
| Example 14 | $(Fe_{0.1}Ni_{0.9})_{78}Si_8B_{14}$ | −60 | 7,000 | 7 |
| Comparative Example 4 | $(Fe_{0.7}Ni_{0.2})_{78}Si_8B_{14}$ | 440 | 2,000 | 12 |
| Example 15 | $(Fe_{0.3}Ni_{0.67}Cr_{0.03})_{78}Si_8B_{14}$ | −48 | 25,000 | 3 |
| Example 16 | $(Fe_{0.3}Ni_{0.66}Cr_{0.04})_{78}Si_8B_{14}$ | −65 | 25,000 | 3 |
| Comparative Example 5 | $(Fe_{0.3}Ni_{0.61}Cr_{0.09})_{78}Si_8B_{14}$ | −140 | 11,000 | 15 |
| | MN—Zn Ferrites | 120 | 6,000 | 10 |

*ΔT: Temperature-difference between the temperature showing maximum value of $\mu'_{10k}$ and the temperature of Curie point.

The $\mu'_{10k}$ value and Tc were measured after the heat cycle ranging from room temperature to Tc. As the results, no variation of Tc with time and no deterioration of $\mu'_{10k}$ were virtually recognized about amorphous alloys having the composition which may render the Tc lower than 200° C., namely, the amorphous alloys of, for instance, $a \geq 0.2$ in the case of Example 1 and $a \geq 0.4$ in the case of Example 2.

As explained above, the temperature sensitive amorphous alloy according to this invention has excellent temperature sensitive characteristics such that it shows large temperature-variation of magnetic permeability in the vicinity of its Curie point; it can vary the magnetic permeability abruptly because of its narrow ΔT it has higher thermal conductivity and quick heat-response since it is of a metallic material and yet of a thin plate; it is possible to easily adjust the Curie point and optionally change the preset temperature to a temperature lower than 200° C. by varying its composition, particularly, the Ni content. Thus, it is a temperature sensitive magnetic material industrially advantageous as a temperature sensor.

Figure 1B:
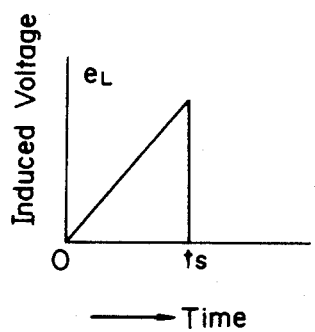

This temperature sensitive magnetic material may be used as a toroidal core as shown in FIG. 1, or a long and linear material may be used as such for a temperature sensor.

We claim:

1. A temperature sensitive amorphous magnetic alloy for use in a temperature sensor, having a Curie point of not higher than 200° C., said alloy consisting essentially of a composition represented by the formula

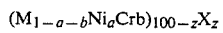

wherein
M represents a cobalt atom (Co) or an iron atom (Fe);
X represents at least one of a phosphorous atom (P), a boron atom (B), a carbon atom (C) and a silicon atom (Si);
a is a numeral ranging between 0.2 and 0.8 inclusive when M is Co, or a is a numeral ranging between 0.4 and 0.9 inclusive when M is Fe;
b is a numeral between 0 and 0.05; such that the sum of a and b does not exceed 0.8 when M is cobalt or 0.9 when M is iron; and
z is a numeral ranging between 15 an 30 inclusive, wherein a and z are selected such that the temperature difference between the temperature showing the maximum value of effective permeability at 10 kHz and the temperature of the Curie point is less than 10 centigrade degrees.

2. A temperature sensitive amorphous magnetic alloy according to claim 1, wherein M is Co.

3. A temperature sensitive amorphous magnetic alloy according to claim 2, wherein b is O.

4. A temperature sensitive amorphous magnetic alloy according to claim 3, wherein a is between 0.5 and 0.7 inclusive and z is between 20 and 25 inclusive.

5. A temperature sensitive amorphous magnetic alloy according to claim 1, wherein M is Fe.

6. A temperature sensitive amorphous magnetic alloy according to claim 5, wherein b is O.

7. A temperature sensitive amorphous magnetic alloy according to claim 6, wherein a is between 0.6 and 0.8 inclusive and z is between 20 and 25 inclusive.

* * * * *